(12) United States Patent
Ungar

(10) Patent No.: US 6,993,755 B1
(45) Date of Patent: Jan. 31, 2006

(54) DYNAMIC COMPILATION CONTROL

(75) Inventor: David M. Ungar, Mountain View, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 794 days.

(21) Appl. No.: 10/044,112

(22) Filed: Oct. 24, 2001

(51) Int. Cl.
G06F 9/45 (2006.01)

(52) U.S. Cl. .................................................. 717/158

(58) Field of Classification Search ................ 717/114, 717/140, 145–153, 160; 712/222
See application file for complete search history.

(56) References Cited

U.S. PATENT DOCUMENTS

| | | | | |
|---|---|---|---|---|
| 5,970,249 A | * | 10/1999 | Holzle et al. ............... | 717/153 |
| 5,978,585 A | * | 11/1999 | Crelier ....................... | 717/145 |
| 6,189,141 B1 | * | 2/2001 | Benitez et al. .............. | 717/153 |
| 6,298,477 B1 | * | 10/2001 | Kessler ....................... | 717/145 |
| 6,427,234 B1 | * | 7/2002 | Chambers et al. .......... | 717/140 |
| 6,530,075 B1 | * | 3/2003 | Beadle et al. ............... | 717/114 |

OTHER PUBLICATIONS

Arnold et al., "Adaptive Optimization of the Jalepeno JVM", Oct. 2000, ACM Sigplan: Conference on object oriented Programming, Systems, Languages, and Applications, pp. 1-19.*
Beck, Kent, Smalltalk Best Practice Patterns, 1997 by Prentice Hall PTR, pp. 13-16, pp. 171-189.
Calingaert, Peter, Assemblers, Compilers, and Program Translation, 1979 Computer Science Press, Inc., pp. 73-232.

* cited by examiner

*Primary Examiner*—Kakali Chaki
*Assistant Examiner*—Tuan A. Vu
(74) *Attorney, Agent, or Firm*—Zagorin O'Brien Graham LLP

(57) ABSTRACT

Modern programming languages have stimulated work on systems that dynamically compile or optimize frequently executed portions of programs. In practice, such systems typically rely on ad hoc heuristics. For example, a system may optimize (or compile) some code once its execution count exceeds a given threshold. An analytical model has been developed that expresses performance of such a system. In one embodiment, the model is based on a bytecode frequency histogram, which indicates (for a given program) how many bytecodes run for how many times. It predicts that the optimal compilation threshold will occur where the hazard rate falls through the reciprocal of the break-even point, the number of times a compiled bytecode must be executed to recoup its compilation time. Based on the insight provided by the model, a dynamic compilation control technique has been developed.

20 Claims, 4 Drawing Sheets

DYNAMIC COMPILATION CONTROL

BACKGROUND

1. Field

The invention relates to selective optimization of portions of a computer program based on observations or predictions of program execution behavior, in particular, to techniques for dynamically optimizing selected portions of a computer program based on identification of a break-even point.

2. Description of the Related Art

Typically, software programmers generate software programs by writing language statements in a human-readable language to create a file containing source statements or source code. In order to run the file, the source statements must be prepared for execution by being made machine-readable. For example, appropriate language compiler is typically run on file containing the source statements. A compiler is a special program that processes statements written in a particular programming or human-readable language and turns them into machine-readable language or code that is usable by a computer's processing unit. When executing or running, the compiler operates on the human-readable program by first parsing or analyzing all of the language statements and then, in one or more successive stages or passes, builds the output code. Traditionally, the output of the compilation has been called object code or sometimes an object module. The object code is machine code that a processing unit can process or execute one instruction at a time.

The Java™ programming language, a language used in object-oriented programming, has popularized the possibility of compiling output (e.g., "bytecode") that can run on any computer system platform for which a Java virtual machine or bytecode interpreter is provided to convert the bytecode into instructions that can be executed by the actual hardware of the platform. A bytecode interpreter, or simply "interpreter," will interpret the bytecode one instruction at a time for execution by the hardware. Alternatively, a Java just-in-time ("JIT") compiler (e.g., a second compiler) at the particular system platform compiles the bytecode into the particular system code as though the program had been compiled initially on that platform. Although recompiling a bytecode often takes more time than interpreting the bytecode, once the code has been recompiled by the JIT compiler it will usually run more quickly on the hardware platform. Thus, an interpreter favors startup over execution efficiency while a compiler slows start-up time but executes programs faster. Notwithstanding, a typical JIT compiles all code that is executed, and hence must attain compilation speed by sacrificing code quality. Thus, source code may be compiled into bytecode which is readable by a Java virtual machine, and the bytecode may in turn be recompiled or interpreted for execution by the actual hardware.

The Java programming language has stimulated work on high performance implementations that dynamically compile or optimize frequently executed portions of programs. The common practice of compiling everything that executes even one time can squander compilation time. Systems that deviate from this practice typically rely on ad hoc heuristics. A reasoned and effective set of heuristics is desirable to optimize the effect of such dynamic compilation, so that time is spent optimally compiling program portions that are frequently executed and not wasted compiling infrequently used program portions.

SUMMARY

It has been discovered that certain portions of a computer program may be effectively selected for interpretation or recompilation using a compilation threshold which is calculated using an execution break-even value or point, and a program portion hazard rate. A break-even value provides the number of expected portion executions at which it becomes cost effective to recompile and optimize the program portion for future executions rather than interpret the portion immediately prior to each expected execution. With perfect knowledge of the future execution of a program, this value provides a useful compilation threshold value. However, such perfect knowledge is often unavailable. When there is imperfect knowledge regarding the execution of a program, principles of reliability engineering can be used to calculate a program portion hazard rate for use in providing a more effective compilation threshold. The program portion hazard rate provides the probability that a program portion will stop being executed given that the program portion has already been executed a given number of times. An effective compilation threshold may be set to correspond to the point at which at which a decreasing hazard rate corresponds to a reciprocal of the break-even value.

By observing execution properties of portions of a computer program and by applying such a computed compilation threshold, individual portions of the computer program may be selectively recompiled during execution of the computer program based on correspondence between the observed execution for the individual portions and the compilation threshold. Such a system and method can be used to optimize dynamic compilation so that time is spent optimally compiling program portions that are determined to be frequently executed going forward and not wasted compiling program portions that are determined to be infrequently executed going forward.

Thus, in one embodiment of the present invention, a method of selecting certain portions of a computer program for compilation is provided. The method includes computing a compilation threshold. The compilation threshold corresponds to a point at which a decreasing hazard rate of a program portion corresponds to the reciprocal of a break-even number of executions of the program portion that recoup computational costs of compilation. During execution of the computer program, the program portions are dynamically compiled based on correspondence between observed execution for the individual portions and the compilation threshold. The computation of the compilation threshold may be performed coincident with execution of the computer program, and may use runtime information from the execution. Also, the hazard rate, hr(x), for a particular one of the computer program portions may be used to at least approximate a probability that the particular program portion will stop being executed in the computer program given that the particular portion has executed x times. In a further embodiment, the break-even number of executions may be defined to be a function of time or other execution resource to (i) execute an uncompiled version of a particular one of the computer program portions, (ii) compile the particular portion, and/or (iii) execute a compiled version of the particular portion.

In another embodiment, an execution environment is provided for a computer program encoded using execution codes that may optionally be executed in either first or second form. The execution environment includes a dynamic compilation mechanism that transforms an implementation of a particular execution code to the second form thereof, wherein the second form is substantially optimized as compared to the first form. For at least the particular execution code, the execution environment includes an execution-time measurement of execution frequency at which a decreasing hazard rate corresponds to a reciprocal of a break-even number of executions that recoup computational costs of transformation to the second form. The dynamic compilation mechanism is responsive to the execution-time measurement. In a further embodiment, the first and second forms respectively include uncompiled and compiled version of the execution code, or the first and second forms both include compiled versions of the execution code, but the second form is substantially optimized as compared to the first form. In yet a further embodiment, the execution code may be a bytecode.

In another embodiment, a computer program product is encoded in at least one computer readable medium. The computer program product includes first and second instructions executable in an information processing system. The first instructions are executable to instrument execution of a computer program executing thereon. The first instructions providing data indicative of execution frequency for at least a particular portion of the computer program. The second instructions are executable to identify a particular point in the execution of the computer program at which a decreasing hazard rate calculated from the execution frequency data for the particular portion of the computer program corresponds to a reciprocal of a break-even number of executions thereof that recoup computational costs of transformation to an optimized form.

In a further embodiment, the particular portion is dynamically compiled to the optimized form coincident with identification of the particular point. In yet a further embodiment, the computer program product includes a dynamic compiler. In yet a further embodiment, the computer program product is embodied as part of an execution environment for the computer program. In a further embodiment, the computer program product is embodied as part of the computer program. In a further embodiment, the at least one computer readable medium is selected from the set of a disk, tape or other magnetic, optical, or electronic storage medium and a network, wireline, wireless or other communications medium.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, will become apparent in the detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DESCRIPTION OF THE PREFERRED EMBODIMENT(S)

Figure 1:
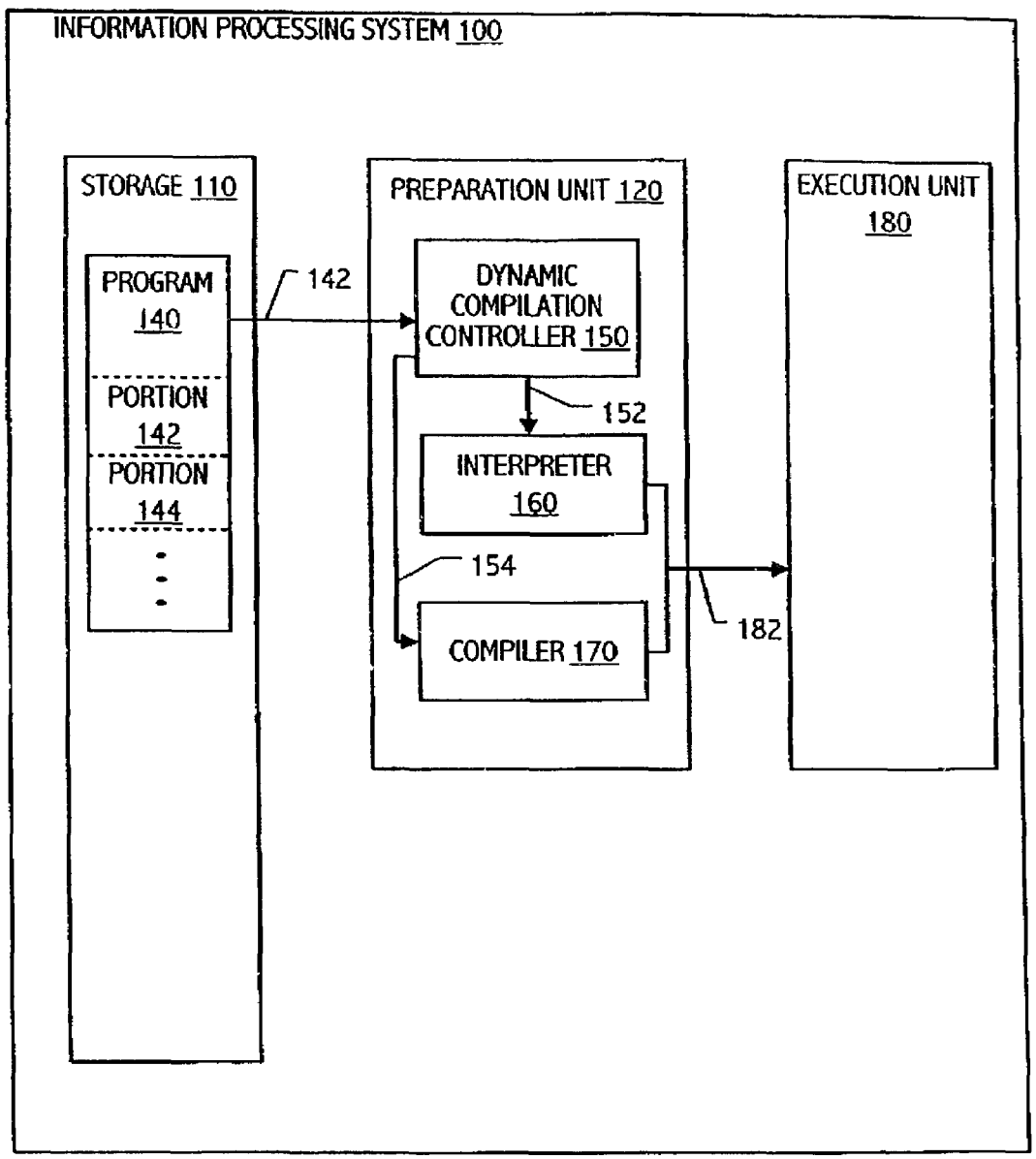
FIG. 1 is a flow chart showing one embodiment of a method of running a computer program in accordance with the invention.

The following discussion is intended to provide a detailed description of at least one example of the invention to aid those skilled in the art to understand and practice the invention. For example, FIG. 1 shows an exemplary information processing system which provides a useful reference in discussing various aspects of the invention. Of course, the information processing system has been simplified for purposes of discussion, and it is just one of may different types of appropriate systems that may be used in accordance with the invention. Consequently, the following discussion should not be taken to be limiting of the invention itself. Rather, any number of variations may fall within the scope of the invention which is properly defined in the claims following this description.

Referring to FIG. 1, system 100 includes storage 110, preparation unit 120, and execution unit 180. Storage 110 includes program 140. Storage 110 is coupled to provide program 140 to preparation unit 120 via connection 142. Preparation unit 120 is coupled to provide compiled and/or interpreted program portions to execution unit 180 via connection 182. As mentioned, the architecture shown in FIG. 1 is simplified for the purposes of discussion. For example, connections described herein may be physical or logical, and may be a part of a path including other elements which are not shown so as to avoid obfuscation of the invention. One of ordinary skill in the art will realize, based on the teachings herein, that the operations, signals and connections discussed below in relation to system 100 may be performed under control or by way of other logic blocks or collections of other logic blocks which may include hardware and/or software, integrated and/or distributed.

Storage 110 is any one of a variety of computer readable media appropriate for storing a computer program such as program 140. Program 140 is any computer program including at least some source code or other code which must be compiled and/or interpreted prior to use by execution unit 180. For example, program 140 may be a Java program, and may or may not already be compiled into bytecode. Storage 110 is coupled to provide portions of program 140 to preparation unit 120 via connection 142. Such portions may correspond to functions, procedures, methods, routines, objects or bytecodes of program 140, to name just a few examples. Storage 110 may also include various control hardware and software (not shown).

Preparation unit 120 includes dynamic compilation controller 150 which is coupled to receive those portions of program 140 which are to be executed by execution unit 180 and/or to receive information regarding those portions. As with other architectural blocks of system 100, dynamic compilation controller 150 may include hardware and software of one or several other architectural blocks. Dynamic compilation controller 150 may also include or operate under control of portions of program 140 or other software stored in storage 110.

Preparation unit also includes interpreter 160 and compiler 170, which are coupled to receive the portions under the control of dynamic compilation controller 150 via connection 152 and connection 154, respectively. Using compilers 160, 170, preparation unit 120 prepares (e.g., compiles and/or interprets) the received portions of program 140 so that such portions will be executable by execution unit 180. Thus, in the present embodiment, preparation unit 120 is capable, among other things, of providing a just-in-time compile of program 140 for execution unit 180. Preparation unit 120 provides system 100 with virtual machine capability.

Dynamic compilation controller 150 routes portions to one of interpreter 160 and compiler 170 for preparation for execution by execution unit 180. To control this routing, dynamic compilation controller 150 analyzes a break-even value, a compilation threshold, and an observed execution frequency or count, for the program or portions thereof. Such analysis is described in greater detail below with reference to FIG. 2. Dynamic compilation controller 150 determines whether the compilation threshold has been reached for each program portion received from storage 110. If the compilation threshold has not been reached for a particular program portion, dynamic compilation controller 150 routes such program portion to interpreter 160 where the program portion is interpreted or quickly compiled for execution by execution unit 180. If the compilation threshold has been reached for a particular program portion, dynamic compilation controller 150 routes the program portion to compiler 170 for recompiling or optimization of the program portion for execution by execution unit 180. Recompilation by compiler 170 is often more costly in terms of time or some other system resource measure than is interpretation by interpreter 160, but recompilation is typically more effective than interpretation in reducing execution time by execution unit 180.

Execution unit 180 receives prepared (e.g., interpreted and/or compiled) portions from one of interpreter 160 and compiler 170, and carries out the functionality of such portions. If portions have been compiled by compiler 170, such compiled portions may be temporarily stored (e.g., in storage 110) for later executions of the such portions. Execution unit 180 may include hardware, firmware or software or a combination thereof. In one embodiment, preparation unit 120 and execution unit 180 may be individually viewed as a virtual machine and a microprocessor, respectively, and preparation unit 120 and execution unit 180 may be collectively viewed as a logical processor.

Figure 2:
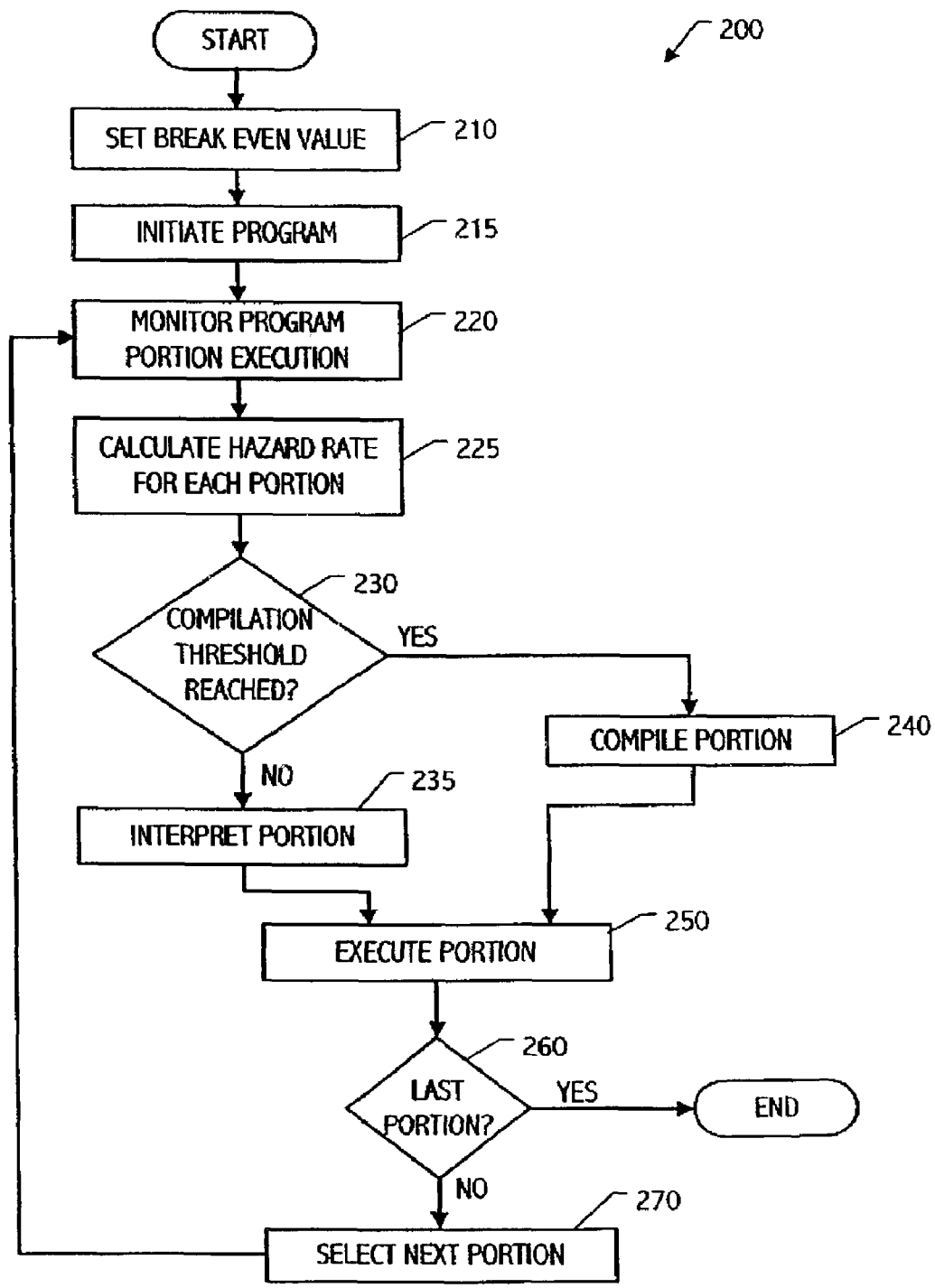
FIG. 2 is an information processing system structured in accordance with the invention.

FIG. 2 shows the flow of execution of a computer program in accordance with one embodiment of the invention. In the embodiment shown, a program is executed and monitored to collect data regarding execution of the portions thereof. The execution data is used to determine a dynamic compilation threshold. Although the execution flow of FIG. 2 is discussed below with reference to system 100 of FIG. 1, the execution flow may be used in other exemplary systems.

During set break-even value operation 210, a break-even value is set for the computer program or, alternatively, for each program portion. The break-even value is the number of expected portion executions at which it becomes cost effective to recompile and optimize the program portion for all or a substantial number of later executions rather than to interpret the portion immediately prior to each execution thereof. If a program portion is expected to be executed more than the break-even number of times, then it is more efficient to optimally compile the program portion even when such optimal compilation requires more time than interpretation of the program portion. If the expected number of executions of the program portion is less than the break-even value, then it is more efficient to interpret the program portion immediately prior to each future execution of the program portion. In one embodiment, the set break-even value step 210 may occur during execution of the program.

In the embodiment shown, after set break-even value step 210 and during initiate program step 215, execution of program 140 on information processing system 100 is initiated. For example, a logic block of system 100 may call program 140 from storage 110, which provides program 140 to preparation unit 120 for preparation to be executed by execution unit 480.

After initiate program step 215 and during monitor program step 220, the execution of program 140 is monitored by system 100 (e.g., through dynamic compilation controller 150 and, if appropriate, other logic blocks including perhaps storage 110). For example, in one embodiment the frequency of executions of each program portion of program 140 is monitored by system 100.

After monitor program step 220 and during calculate hazard rate step 225, the hazard rate is calculated for each portion of program 140. The hazard rate as the probability that a bytecode will stop being executed, given that it has already run x times. It makes sense that when the hazard rate is too high we don't want to compile the bytecode because it is too likely to stop being executed. Likewise, when the hazard rate is too low, we are too late in compiling the bytecode, it is so unlikely to stop being executed that it should have been compiled before The theoretical and practical aspects of calculation and use of the hazard rate are discussed below in greater detail with reference to the provided analytical model.

After calculate hazard rate step 225 and during compilation threshold decision 230, dynamic compilation controller 150 determines whether the compilation threshold has been reached for each portion of program 140. As is discussed in greater detail below, the compilation threshold is triggered, if at all, when the decreasing hazard rate corresponds to the reciprocal of the break-even value. If the compilation threshold has not been reached, the portion is interpreted during interpret portion step 235 by interpreter 160. If the compilation threshold has been reached, the portion is recompiled during compile portion step 240 by compiler 170. The results of such compilation may be stored in storage 110 for subsequent executions of that portion by execution 180.

After interpretation or compilation by interpreter 160 and compiler 170 during steps 235 and 240, execution unit 180 executes the program portion during execute portion step 250. After execute portion step 250 and during last portion decision 260, system 100 determines whether the current program portion is the last program portion of program 140. If the current program portion is the last program portion, execution of program 140 is terminated. If the current program portion is not the last program portion, control transitions to monitor program step 220.

Analytical Model

An analytical model supporting the above embodiments has been formulated that expresses the performance of such a system and that may be used to improve such performance. The model is based in part on a frequency histogram of bytecode execution. For a given program, a bytecode frequency histogram indicates how many times each bytecode is executed. Based on the teachings herein, the bytecode frequency histogram may be used to select an optimized (e.g., improved) compilation threshold where the hazard rate falls through the reciprocal of the break-even value, the number of times a compiled bytecode must be executed to recoup its compilation time. The analytical model can help engineers and programmers to understand the consequences of simple policies, of compiler-design tradeoffs, and of different types of workloads, and it can suggest values for key parameters that are provably optimal.

In one embodiment, program 140 runs for a finite time, and it is desirable to minimize that time. Other embodiments may involve the optimization of a program based on pause time or interactive performance. In the above discussed example, code may be run in two ways: interpreted or compiled. If compiled, the compilation occurs at run-time and so detracts from minimizing total running time. For the sake of simplicity, the following discussion focuses bytecodes as the program portions. That is, bytecodes are the units of both compilation and execution. Other embodiments may use other forms of portions.

A few definitions will now be introduced. To introduce the analytical model in the simplest way, one may assume for the sake of the immediately following discussion (and revisit later) that each bytecode takes the same amount of time to interpret, that each bytecode takes the same amount of time to compile, and that once compiled, each bytecode takes the same time to execute:

$T_1$=time to interpret a bytecode
$T_C$=time to compile a bytecode
$T_E$=time to execute a (compiled) bytecode Our analysis will be based on bytecode frequencies. That is, the analysis will be based not the relative frequencies of different kinds of bytecodes, but rather the number of bytecodes contained in the program that run a given number of times in the course of one run of a program:

$f(x)$≡the number of bytecodes that run $x$ times

The (complementary) distribution as well as the density are usefully defined:

$\overline{F}(x) \equiv$ the number of bytecodes that run at least $x$ times $$\overline{F}(x) \equiv \int_x^\infty f(y)\,dy$$

$$\frac{d}{dx}\overline{F}(x) = -f(x)$$

$\overline{F}(0)$ = the total number of bytecodes in the program

Note that another embodiment of the model would use summations instead of integrals because a bytecode cannot execute half a time, but the common statistical practice of approximating discrete functions with continuous ones is followed herein.

The number of executions of bytecodes that run at least a certain number of times:

$E(x) \equiv$ # of executions of bytecodes that run at least $x$ times $$E(x) = \int_x^\infty y f(y)\,dy$$

$$\frac{d}{dx}E(x) = -xf(x)$$

$E(0)$ = total # of executions of bytecodes in the program $E(0) - E(x) =$ of executions of bytecodes that run less than $x$ times

In the following discussion regarding the analytical model, a mathematical model for two cases is presented: one with perfect knowledge in which a program's profile is known a priori, and one with imperfect knowledge in which the profile is unknown.

Compilation Policy in an Idealized Scenario: Perfect Knowledge

Suppose that each program came with a profile that indicated how many times each of its bytecodes would run. Then, the obvious compilation policy would be to first compile every bytecode that was going to run more than a certain number of times, and then to run the program, interpreting the infrequently running bytecodes and executing the (compiled) frequently running bytecodes. What would an optimal compilation threshold in this case be?

We start with $T_{tot}(x)$≡Total time to run the program, with compilation threshold $x$ This time will be the sum of three components: the time to compile the compiled bytecodes, the time to execute the compiled bytecodes, and the time to interpret the non-compiled bytecodes. So $T_{tot}(x) = T_C \overline{F}(x) + T_E E(x) + T_1[E(0) - E(x)] =$
$T_1 E(0) - [(T_1 - T_E)E(x) - T_C \overline{F}(x)]$ The second line above rearranges the total time to be a sum of the time it would take to interpret all executions, $T_1 E(0)$, minus the net time saved by the compiler, $(T_1-T_E)E(x) - T_C \overline{F}(x)$. Rather than minimizing the total time, it will prove more convenient to maximize this latter term. We normalize it with respect to $T_1 - T_E$, the execution time saved by one compiled bytecode execution:

$$Speedup(x) \equiv \frac{T_1 E(0) - T_{tot}(x)}{T_1 - T_E}$$

$$= E(x) - \frac{T_C}{T_1 - T_E}\overline{F}(x)$$

To find the optimal compilation threshold, we set the first derivative of the speedup to zero (using our definitions for $E(x)$ and $\overline{F}(x)$ above), and will check for a negative second derivative:

$$\frac{d}{dx}Speedup(x) = -xf(x) + \frac{T_C}{T_1 - T_E}f(x)$$

$$= \left(\frac{T_C}{T_1 - T_E} - x\right)f(x)$$

Setting to zero:

$$\frac{d}{dx}T_{tot}(x)\bigg|_{x=x_{opt}} = \left(\frac{T_C}{T_1 - T_E} - x_{opt}\right)f(x_{opt})$$

$$\therefore x_{opt} = \frac{T_C}{T_1 - T_E} \text{ or } f(x_{opt}) = 0$$

and checking the second derivative:

$$\frac{d^2}{dx^2}T_{tot}(x) = \left(\frac{T_C}{T_1 - T_E} - x\right)f'(x) - f(x)$$

$$0 > \frac{d^2}{dx^2}T_{tot}(x)\bigg|_{x=x_{opt}}$$

-continued $$0 > \left(\frac{T_C}{T_I - T_E} - x_{opt}\right)f'(x_{opt}) - f(x_{opt})$$

$$f(x_{opt}) > \left(\frac{T_C}{T_I - T_E} - x_{opt}\right)f'(x_{opt})$$

This inequality shows that of the two possibilities for a zero first derivative, $$x_{opt} = \frac{T_C}{T_I - T_E}, \text{ or } f(x_{opt}) = 0,$$

only the former condition yields an optimal speedup. Thus, $$x_{opt} = \frac{T_C}{T_I - T_E}$$

Note that the optimal threshold does not depend on the frequency distribution of the program. It is simply the ratio of the compilation time per bytecode to the time saved by executing a bytecode instead of interpreting it. In other words, it represents a break-even point; if this value is 10, then a compiled bytecode must execute ten times in order to recoup the investment in compilation time. It is convenient to denote this quantity with a new symbol:

$$\beta \equiv \text{the break} - \text{even frequency} \equiv \frac{T_C}{T_I - T_E} \text{ so}$$

$$Speedup(x) = E(x) - \beta \overline{F}(x) \text{ and } x_{opt} = \beta$$

Suppose a very fast (and stupid) compiler takes two milliseconds to compile a bytecode and speeds up the execution time from one millisecond for interpretation to half a millisecond. Then, $T_C$=2 ms, $T_I$=1 ms, $T_E$=0.5 ms. So $$x_{opt} = \frac{2 \text{ ms}}{1 \text{ ms} - 0.5 \text{ ms}} = 4,$$

and the compiler should be used on any bytecode executing four times or more. On the other hand, a more sophisticated compiler may take 12,000 cycles to compile a bytecode, reducing the interpretation time of 1,000 cycles to an execution time of 2 cycles. Then, $T_C$=12,000, $T_I$=1,000, $T_E$=2, and $$x_{opt} = \frac{12,000}{1,000 - 2} \cong 12.$$

So any bytecode that runs more than 12 times (the answer is slightly greater than 12) should be compiled. Although the former compiler will be used on more bytecodes, it may not yield the best performance. In order to understand this better, we next examine the components of the speedup.

Total Speedup from Compilation (With Perfect Knowledge)

Armed with the above result for the optimal compilation threshold, we can examine the speedup obtained with the optimal policy. Recall that $$T_I E(0) - T_{tot}(x)|_{x=x_{opt}} = (T_I - T_E)[E(\beta) - \beta \overline{F}(\beta)]$$

The first factor is merely the per-bytecode efficacy of the compiler. Regarding the second factor, we can substitute the definitions of E and F and simplify to obtain:

$$E(\beta) - \beta \overline{F}(\beta) = \int_\beta^\infty (y - \beta) f(y) dy$$

This integral can be interpreted as the expected amount by which the bytecode frequency exceeds the break-even frequency for the population of compiled bytecodes. Accordingly, the characteristics of the program finally make themselves felt: a program with more high-frequency bytecodes will have a larger expected excess. Since the speedup is the product of the factors, a compiler that produces better code is guaranteed to deliver a greater speedup, as long as its compile time increases no more than in proportion to its efficacy (i.e., constant break-even point). This is a sufficient, not necessary condition.

Compilation Policy in the Non-Ideal Scenario: Less-Than-Perfect Information

In the more typical case, a profile is not available at the outset of execution of a program. A profile may be obtained offline by using a practice run, or dynamically by instrumenting a virtual machine, for example. A virtual machine can observe the program's behavior as it unfolds in order to predict the future. One of the simplest ways to do this would be to count the number of times each bytecode executes, and to compile a bytecode when its count surpasses a threshold. We turn now to an analysis of this plausible heuristic and will seek to understand what the optimal compilation threshold might be. Once a profile is obtained, the hazard rate function can be computed, and the compilation threshold may be set at a point where the compiler's break-even point is equal to the reciprocal of the hazard rate. As before, we denote threshold as x.

As a side note, we know that if at any time a bytecode will run $\beta$ more times, it will be beneficial to recompile that bytecode. So, we can expect that the optimal compilation threshold will turn out to be the one that predicts this, and naively might expect it to be $\beta$.

In this scenario, for any given compilation threshold, the system compiles the same set of bytecodes as before, but it compiles them later. Any bytecode that eventually gets compiled must first slog through x interpreted executions instead of breezing through x compiled executions. So the total execution time will be the same as it was with perfect knowledge, plus a penalty term of $(T_I - T_E) x \overline{F}(x)$, the product of the additional time spent per execution, the number of executions before compilation, and the number of bytecodes involved:

$$T_{totImperfect}(x) = T_{totPerfect}(x) + (T_I - T_E) x \overline{F}(x)$$

$$= T_I E(0) - (T_I - T_E)[E(x) - \beta \overline{F}(x)] + (T_I - T_E) x \overline{F}(x)$$

$$= T_I E(0) - (T_I - T_E)[E(x) - (x + \beta) \overline{F}(x)]$$

As before, it has been rearranged into a term representing the time taken by a totally interpreted run, $T_I E(0)$ and a term representing the speedup thanks to the compiler. Also, as before, we denote the speedup normalized by the per-bytecode execution savings:

$$Speedup_{imperfect}(x) = \frac{T_I E(0) - T_{tot\ Im\ perfect}(x)}{T_I - T_E}$$

$$= E(x) - (x + \beta)\overline{F}(x)$$

Comparing this with the perfect knowledge speedup, $E(x) - \beta\overline{F}(x)$, we can observe that the price of ignorance is $x\overline{F}(x)$.

Optimal Compilation Strategy with Imperfect Knowledge

To find the optimal threshold where the speedup will be maximized, we start by differentiating and substituting for $\overline{F}$ and $E$ $$Speedup'_{imperfect}(x) = E'(x) - (x + \beta)\overline{F}'(x) - \overline{F}(x)$$

$$= -xf(x) + xf(x) + \beta f(x) - \overline{F}(x)$$

$$= \beta f(x) - \overline{F}(x)$$

We will also need the second derivative:

$$Speedup''_{imperfect}(x) = \beta f'(x) + f(x)$$

At maximal speedup (recalling that $\beta$ is always positive for the third step):

$$\{Speedup'_{imperfect}(x)|_{x=x_{opt}} = 0\} \wedge \{Speedup''_{imperfect}(x)|_{x=x_{opt}} < 0\}$$

$$\{\beta f(x_{opt}) - \overline{F}(x_{opt}) = 0\} \wedge \{\beta f'(x_{opt}) + f(x)_{opt} < 0\}$$

$$\left\{\frac{f(x_{opt})}{\overline{F}(x_{opt})} = \frac{1}{\beta}\right\} \wedge \left\{f'(x_{opt}) < \frac{-f(x)_{opt}}{\beta}\right\}$$

At this point, the field of reliability engineering, a field used to study the reliability of light bulbs, semiconductors and the like. (See, e.g., Richard E. Barlow and Frank Proschan, Mathematical Theory of Reliability, SIAM Classics in Applied Mathematics, Philadelphia, 1996, originally published by John Wiley & Sons, Inc., New York, 1965.) For any probability density $f(x)$, the hazard rate (or failure rate) is defined as:

$$hr(x) = \frac{f(x)}{\overline{F}(x)}$$

Thus the requirement for optimality is just:

$$\left\{hr(x) = \frac{1}{\beta}\right\} \wedge \left\{f'(x_{opt}) < \frac{-f(x)_{opt}}{\beta}\right\}$$

In reliability engineering, the hazard rate can be interpreted as the probability that a part will fail, given that it has operated without failure for x time units. In our case, we can interpret the hazard rate as the probability that a bytecode will stop being executed, given that it has already run x times. It makes sense that when the hazard rate is too high we don't want to compile the bytecode because it is too likely to stop being executed. Likewise, when the hazard rate is too low, we are too late in compiling the bytecode, it is so unlikely to stop being executed that it should have been compiled before.

Thus, we can hypothesize that an optimal threshold will exist only in a region where the hazard rate is falling. Let's confirm this:

$$hr'(x) = \frac{d}{dx}\left[\frac{f(x)}{\overline{F}(x)}\right]$$

$$= \frac{f'(x)}{\overline{F}(x)} - \frac{f(x)}{\overline{F}(x)^2}\overline{F}'(x)$$

$$= \frac{f'(x)}{\overline{F}(x)} - \frac{f(x)^2}{\overline{F}(x)^2}$$

$$hr'(x)|_{x=x_{opt}} = \frac{f'(x_{opt})}{\overline{F}(x_{opt})} + \frac{f(x_{opt})^2}{\overline{F}(x_{opt})^2}$$

Substituting in the optimality conditions $$\left\{hr(x_{opt}) = \frac{1}{\beta}\right\} \wedge \left\{f'(x_{opt}) < \frac{-f(x)_{opt}}{\beta}\right\}$$

$$hr'(x)|_{x=x_{opt}} = \frac{f'(x_{opt})}{\overline{F}(x_{opt})} + \frac{1}{\beta^2} \text{ (using the first condition above)}$$

$$hr'(x)|_{x=x_{opt}} < \frac{-f(x)_{opt}}{\beta \overline{F}(x_{opt})} + \frac{1}{\beta^2} \text{ (using the second condition)}$$

$$hr'(x)|_{x=x_{opt}} < -\frac{1}{\beta^2} + \frac{1}{\beta^2} \text{ (using the first again)}$$

$$hr'(x)|_{x=x_{opt}} < 0$$

Stating the full optimality conditions in terms of the hazard rate:

$$\left[hr(x_{opt}) = \frac{1}{\beta}\right] \wedge [hr'(x_{opt}) < 0]$$

Thus, the optimal number of times a bytecode should be interpreted before compiling it will be the frequency where the hazard rate falls through the reciprocal of the break-even point. If the frequency distribution does not exhibit a falling hazard rate, there will be no such optimum; instead it will be better to either compile everything first, or to compile nothing ever.

When thinking about this problem, one imagines that a bytecode executes, its counter trips (i.e., the bytecode is observed to execute x times), and the system must decide whether or not to compile it. One may think that the goal is to predict how many more times the bytecode will run given that knowledge that it has run for x times, and that the best value for the compilation threshold will be the one that maximized the expected number of future executions of the bytecode. The reality is slightly more complicated.

In order to compute the expected number of additional executions of a bytecode, we will need a formula that gives the probability that the total number of executions of a bytecode is given that the bytecode executes at least x times:

$$f(y|y \geq x) \equiv \text{prob. total executions is } y \text{ given } y \text{ at least } x$$

$$f(y|y \geq x) = \frac{f(y)}{\overline{F}(x)} \text{ (given } y \geq x\text{)}$$

Since we are interested in the expected number of additional executions, we must integrate and subtract:

$$x_{additional} \equiv y - x$$

$$\langle x_{additional} \rangle = \langle y - x | y \geq x \rangle$$

$$\langle x_{additional} \rangle = \int_x^\infty (y-x)\frac{f(y)}{\overline{F}(x)} dy$$

$$\langle x_{additional} \rangle = \frac{\int_x^\infty y f(y) dy}{\overline{F}(x)} - \frac{\int_x^\infty x f(y) dy}{\overline{F}(x)}$$

$$\langle x_{additional} \rangle = \frac{E(x)}{\overline{F}(x)} - x$$

To maximize the expected number of additional executions (given that a bytecode has executed x times) this is what we would be optimizing. However, we need to factor in the cost of compilation. The additional number of executions determines the benefit from compilation, but what we really want to optimize is the benefit minus the cost, and (for our single bytecode) this is $\langle x_{additional} \rangle - \beta$. Furthermore, instead of optimizing for a single bytecode, we need to optimize for all of them. So, we must multiply this expression (the net benefit for a single bytecode) by the number of applicable bytecodes. But this is just $\overline{F}(x)$. Putting it all together, we want to optimize $(\langle x_{additional} \rangle - \beta) \times \overline{F}(x)$:

$$(\langle x_{additional} \rangle - \beta) \times \overline{F}(x) = \left[\frac{E(x)}{\overline{F}(x)} - x - \beta\right] \times \overline{F}(x)$$

$$= E(x) - (x + \beta)\overline{F}(x)$$

This is the same expression we optimized based on speedup instead of expected additional executions. The two really are equivalent.

Results with Analytic Frequency Distributions

Armed with the above analytical results, we now examine two simple continuous distributions. First, assume that the bytecode frequency is uniformly distributed up to 1000 (unrealistic perhaps, but a useful example in its simplicity). FIGS. 3A through 3D respectively show plots of the bytecode frequency density f(x), the complementary cumulative distribution $\overline{F}(x)$, hazard rate, and speedups, assuming a break-even point of 100. Recall that the density shows how many bytecodes have exactly a given number of repetitions, and that the complementary cumulative distribution shows how many bytecodes have at least a given number of repetitions. As expected, the perfect speedup peaks at 100, and the imperfect one has no optimum, except for compiling everything right away. (Of course, there is no profit in compiling any bytecode with a frequency less than one, a distortion which occurs due to the use of integrals instead of summations.)

Figure 3A:
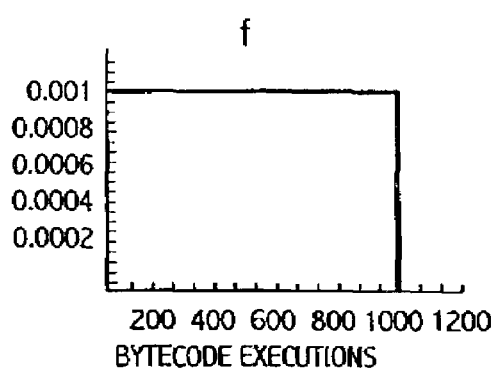
FIGS. 3A–3D show a series of plots illustrating the performance of an exemplary program in a system in accordance with the invention.
Figure 3B:
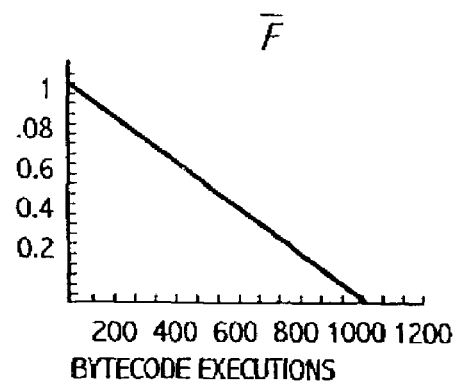
Figure 3C:
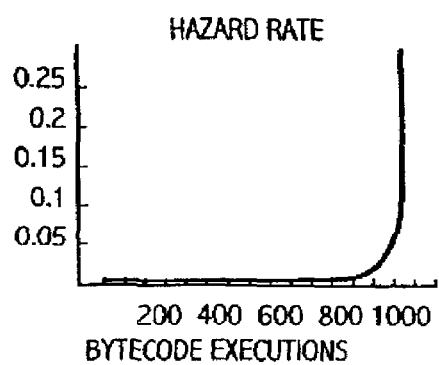
Figure 3D:
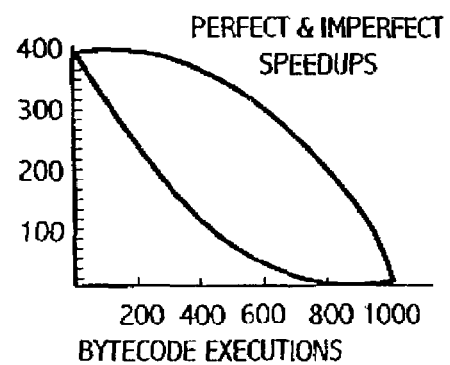
Figure 4A:
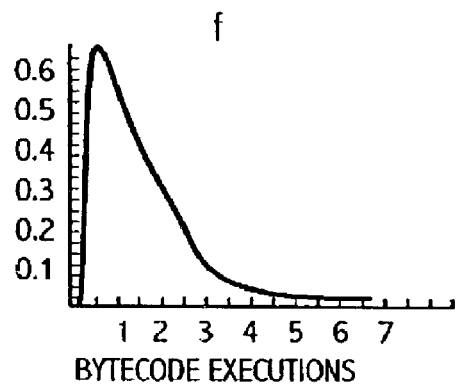
FIGS. 4A–4E show a series of plots illustrating the performance of an exemplary program in a system in accordance with the invention.
Figure 4B:
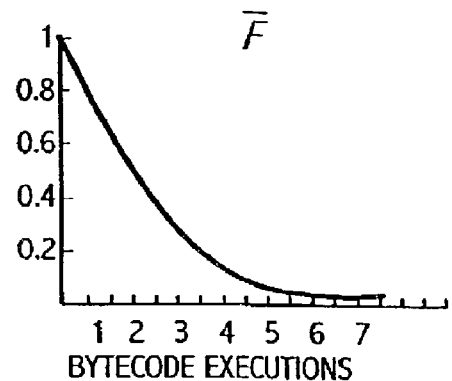

Next, we turn to a distribution with a decreasing hazard rate, the log normal distribution. This distribution assumes that the log of the frequencies is normally distributed (a more realistic assumption than the uniform distribution shown in FIG. 3A). FIGS. 4A through 3E respectively show plots of the density, complementary distribution, hazard rate, hazard rate with tail, and speedups. Since we have made no attempt to calibrate the parameters of the distribution, the scale of the graphs below has no significance. For example, the break-even point was set to 1.4 for these plots. Recall that the optimal compilation threshold given imperfect knowledge occurs where the hazard rate decreases through $$\frac{1}{\beta}.$$

In this distribution with a falling hazard rate, the imperfect speedup does display a peak, right where the hazard rate falls through $$\frac{1}{\beta} = 0.7$$

Figure 4C:
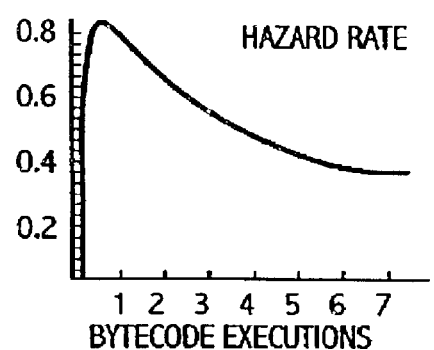
Figure 4D:
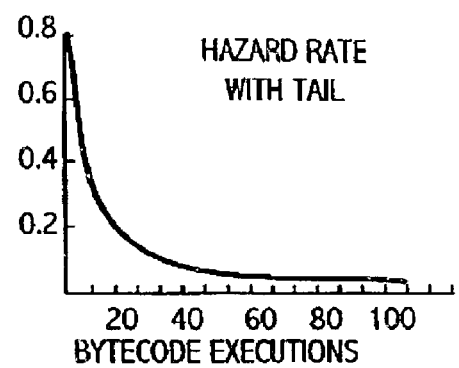
Figure 4E:
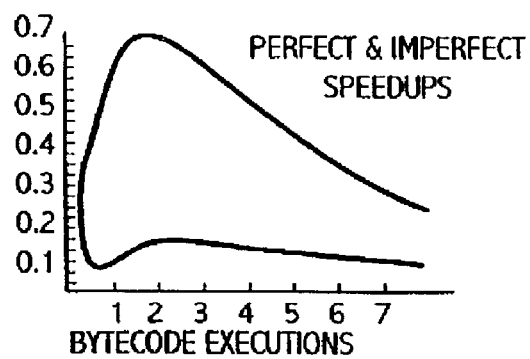

(on the y-axis of FIG. 4C), which corresponds to a compilation threshold of just less than 2 (on the x-axis of FIG. 4C). Therefore, an optimal compilation policy (according to our model) would be to compile any bytecode after it executes two times. Note that in a real life example, the compilation threshold may be much higher. Also, in real life, the hazard rate would likely begin increasing to form a typical hazard rate "U" curve if the program has a finite lifetime. Such "right halves" of the hazard rate curve will be positioned differently, but they do not affect the optimal compilation threshold calculation in any way.

One may guess what the optimal imperfect-knowledge compilation threshold might be, since it might be necessary to observe $\beta$ executions before we are willing to bet on $\beta$ additional executions. If that were the case, then, since the optimal threshold occurs where the hazard rate equals the reciprocal of $\beta$, we would expect that $$hr(x) = \frac{1}{x},$$

and our plots would be straight lines with slopes of -1. Now, the right hand sides of our curves must have positive slope because our programs have finite lifetimes. In other words, as approaches the maximum for the program, the probability that the bytecode will cease to be executed must increase. And on the left hand side of real life programs, the curves typically fall more steeply than log—log hyperbolae. Thus, the optimal compilation threshold typically lies at a fraction of the break-even point, and it may be too conservative to wait until a bytecode's frequency reaches $\beta$ to compile it.

Also, there may be a limit to the optimizations that a dynamic compiler may perform. Recall that $$\beta = \frac{T_C}{T_I - T_E}.$$

As the compiler gets more sophisticated, the $T_I$ term will dominate the denominator, and since $T_C$ will be rising, $\beta$ will have to rise eventually. However, typical plots show that if $\beta$ goes much above 500, then since the hazard rates never drop that low, the model predicts there will be no optimal compilation threshold. With such a compiler, the best strategy would be to either compile all or nothing at all.

When the compilation threshold is low (approaching unity), it is possible to squander half of the available speedup (e.g. for pep test) on premature optimization. In fact, many commercially available virtual machines with JITs do just this, compiling any code that executes even one time. Increasing the compilation threshold to as little as two would recover most of the available speedup.

Revisiting Assumptions

In system 100, any bytecode can be compiled independently of any other. In systems where whole methods are compiled at a time, the break-even points may be expected to be worse, since the net effect will be to increase the compile time above that required to merely compile an inner loop. However, the basic model will likely still hold. For example when one computes the compilation speed per bytecode for the above described embodiment, do not divide the total compiler time by the number of bytecodes compiled. Instead, divide the total compiler time by the number of bytecodes executed by the program (i.e., the sum of all the bytecodes in the interpreter histogram). That gives a more accurate break-even point. Even if a variation in the amount of dead or non-loop code in each method will tend to fuzz the results, the model is still effective.

The foregoing discussion assumes that compilation speeds up the execution of each bytecode by the same amount. Of course, the amount of speedup will vary from bytecode to bytecode. As long as this variation is independent of frequency, the effect should merely be to add noise to the predictions.

Finally the model assumes that the preparation unit 120 can count the executions of each bytecode. This data may be approximated in real life by less accurate, more efficient means such as strategically placed counters.

A simple analytical model can illuminate the relationship of dynamic compilation policy to the total running time of a program. Given a bytecoded program with bytecode frequency distribution f(x), and an implementation whose compiler has a break-even point, it is possible to compute an optimal compilation threshold. If profile information is available, it is best to compile every bytecode whose frequency exceeds β. Without profile information, if a bytecode is compiled after it has executed x times, it is best to set x where the hazard rate, $$\frac{f(x)}{F(x)}$$

falls through $$\frac{1}{\beta}.$$

A term taken from reliability engineering, the hazard rate can be interpreted as the probability that a bytecode will not be executed any more after it has already run times.

The analytical model we have described can be used to evaluate multiple stages of dynamic compilation. Also, when deciding whether it would be advantageous to slow the compiler in order to improve code quality, these results provide a sufficient condition: if β does not increase, the slower compiler that produces better code will increase system performance. Also, the performance of a system that compiles every bytecode that runs can be improved by delaying compilation until a bytecode has run at least twice. However, if it takes more than about 500 executions to recoup the compilation time, there may be no optimal compilation threshold.

The above description is intended to describe at least one embodiment of the invention, not to define the scope of the invention. Rather, the scope of the invention is defined in the claims below. Thus, other embodiments of the invention include other variations, modifications, additions, and/or improvements to the above description.

Those skilled in the art will recognize that boundaries between logic blocks are merely illustrative and that alternative embodiments may merge logic blocks or circuit elements or impose an alternate decomposition of functionality upon various logic blocks or circuit elements. Moreover, alternative embodiments may combine multiple instances of a particular component.

System 100, and any portions thereof, may be integrated on-chip, on-board, in-box or may be distributed. System 100 may be hardware or software or both. For example, the architectural blocks may be integrated circuits on a board, software implementations for execution on general purpose processors, a combination thereof, a virtual machine, or software representations of hardware for design and incorporation into other circuitry.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

A personal computer system can usually be defined as a desk top, floor standing, or portable microcomputer that includes a system unit having a system processor and associated volatile and nonvolatile memory, a display monitor, a keyboard, one or more diskette drives, a fixed disk storage device and an optional printer. A system board is often used to electrically connect these components together. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices.

Each of the blocks/steps of FIG. 2 may be executed by a module (e.g., a software module) or a portion of a module or a computer system user. Thus, the above described method(s), the steps thereof and modules therefor may be executed on a computer system configured to execute the operations of the method and/or may be executed from computer-readable media. The method and/or modules may be embodied in a machine-readable and/or computer-readable medium for configuring a computer system to execute the method. Thus, the software modules may be stored within and/or transmitted to a computer system memory to configure the computer system to perform the functions of the module. Software modules may include script, batch or other executable files, or combinations and/or portions of such files.

Those skilled in the art will recognize that boundaries between the functionality of the above described steps merely illustrative. The functionality of multiple steps may be combined into a single step, and/or the functionality of a single step may be distributed in additional steps. Moreover, alternative embodiments may include multiple instances of a particular step, and the order of steps may be altered in various other embodiments. Likewise, those skilled in the art will recognize that boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

Software modules may be received by system 100, for example, from computer readable media such as storage 110. Computer readable media may be permanently, removably or remotely coupled to system 100. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; holographic media, volatile storage media including registers, buffers or caches, main memory, RAM, etc.; and data transmission media including computer networks, point-to-point telecommunication equipment, and carrier wave transmission media, just to name a few. Other new and various types of computer-readable media may be used to store and/or transmit the software modules discussed herein.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The components and devices described herein are used as examples for sake of conceptual clarity. Consequently, as used herein these specific exemplars are intended to be representative of their more general classes. Furthermore, in general, the use of any specific exemplar herein is also intended to be representative of its class and the noninclusion of any specific devices in any exemplary lists herein should not be taken as indicating that limitation is desired.

The above detailed description has been divided into sections with subheadings in order to highlight the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of selecting certain portions of a computer program for compilation, the method comprising:
computing an execution frequency threshold at which a decreasing hazard rate corresponds to a reciprocal of a break-even number of executions that recoup computational costs of compilation; and
during execution of the computer program, dynamically compiling individual ones of the portions based on the execution frequency threshold
wherein the hazard rate, hr(x), for a particular one of the computer program portions at least approximates a probability that the particular portion will stop being executed in the computer program given that the particular program has executed x times.

2. A method as recited in claim 1,
performing the computation of the compilation threshold coincident with execution of the computer program and using runtime information from the execution.

3. A method as recited in claim 1, wherein the break-even number of executions is a function of:
time or other execution resource to execute an uncompiled version of a particular one of the computer program portions;
time or other execution resource to compile the particular portion; and
time or other execution resource to execute a compiled version of the particular portion.

4. A method as recited in claim 1,
wherein the portions correspond to functions, procedures, methods or routines of the computer program.

5. A method as recited in claim 1,
wherein the portions correspond to bytecodes executable in an execution environment.

6. A method as recited in claim 1,
wherein those computer program portions not selected for compilation are interpreted.

7. A method as recited in claim 1,
wherein a particular one of the computer program portions is interpreted for a first subset of executions thereof; and
wherein, after the dynamic compilation, subsequent executions are of a compiled version of the particular portion.

8. A method as recited in claim 1,
wherein a first subset of executions of a particular one of the computer program portions is of a first compiled version thereof;
wherein, after the dynamic compilation, subsequent executions are of a second compiled version of the particular portion.

9. A method as recited in claim 8,
wherein the second compiled version is substantially optimized as compared with the first compiled version.

10. An computer-implemented execution environment for a computer program including execution codes that may optionally be executed in either a first or a second form thereof, the execution environment comprising:
a dynamic compilation mechanism that transforms an implementation of a particular one of the execution code in a first form to the second form thereof, wherein the second form is substantially optimized as compared to the first form; and
a transformation threshold computation mechanism that computes, at least for the particular execution code, an execution frequency threshold at which a decreasing hazard rate corresponds to a reciprocal of a break-even number of executions that recoup computational costs of transformation to the second form,
wherein the dynamic compilation mechanism is responsive to the computed execution frequency threshold;
wherein the hazard rate, hr(x), for a particular one of the computer program portions at least approximates a probability that the particular portion will stop being executed in the computer program given that the particular program has executed x times.

11. An execution environment as recited in claim 10,
wherein the first and second forms respectively include uncompiled and compiled version of the execution code.

12. An execution environment as recited in claim 10,
wherein the first and second forms both include compiled versions of the execution code, but the second form is substantially optimized as compared to the first form.

13. An execution environment as recited in claim 10,
wherein the execution code is a bytecode.

14. A computer program product encoded in at least one computer readable medium, the computer program product comprising:
first instructions executable on a processor to instrument execution of a computer program executing thereon, the first instructions providing data indicative of execution frequency for at least a particular portion of the computer program; and
second instructions executable to identify a particular execution frequency threshold in the execution of the computer program at which a decreasing hazard rate calculated from the execution frequency data for the particular portion of the computer program corresponds to a reciprocal of a break-even number of executions thereof that recoup computational costs of transformation to an optimized form
wherein the hazard rate, hr(x), for a particular one of the computer program portions at least approximates a probability that the particular portion will stop being executed in the computer program given that the particular program has executed x times,
wherein the execution frequency threshold identified by the second instructions for a particular portion of the computer program indicates an opportunity to dynamically compile the particular portion of the computer program.

15. The computer program product of claim 14, wherein the particular portion is dynamically compiled to the optimized form coincident with identification of the particular point.

16. The computer program product of claim 14, further comprising:
a dynamic compiler.

17. The computer program product of claim 14, embodied as part of an execution environment for the computer program.

18. The computer program product of claim 14, embodied as part of the computer program.

19. The computer program product of claim 14, wherein the at least one computer readable medium is selected from the set of a disk, tape or other magnetic, optical, or electronic storage medium and a network, wireline, wireless or other communications medium.

20. An apparatus comprising:
means which is encoded in at least one computer-readable media, for measuring execution frequency for at least a particular execution code and, based thereon, determining in an execution of computer code that includes the particular execution code a execution frequency threshold at which a decreasing hazard rate corresponds to a reciprocal of a break-even number of executions that recoup computational costs of transformation to the optimized form; and means which is encoded in at least one computer-readable media, for dynamically transforming an implementation of the particular execution code, based on the execution frequency threshold determined by the measuring means, to an optimized form thereof;

wherein the hazard rate, hr(x), for a particular one of the computer program portions at least approximates a probability that the particular portion will stop being executed in the computer program given that the particular program has executed x times.

* * * * *

UNITED STATES PATENT AND TRADEMARK OFFICE
CERTIFICATE OF CORRECTION

PATENT NO. : 6,993,755 B1
APPLICATION NO. : 10/044112
DATED : January 31, 2006
INVENTOR(S) : David M. Ungar Page 1 of 1

It is certified that error appears in the above-identified patent and that said Letters Patent is hereby corrected as shown below:

In column 10, line 5, the bar after $T_{tol}(x)$ should be lengthened, i.e., $$T_I E(0) - T_{tot}(x)\big|_{x=x_{opt}} = (T_I - T_E)\big[E(\beta) - \beta \overline{F}(\beta)\big];$$

In column 11, lines 11 and 12, $x\overline{F}(x)$ should not be separated, it should be kept together on one line;

In column 11, line 16, replace "E" with --E:--;
In column 11, line 26, replace "$\beta f$", with --$\beta f$--
In column 11, line 32, the bar after (x) (both occurrences) should be lengthened, i.e., $$\{Speedup'_{imperfect}(x)\big|_{x=x_{opt}} = 0\} \wedge \{Speedup''_{imperfect}(x)\big|_{x=x_{opt}} < 0\};$$

In column 11, lines 32-35, the carats are grossly oversized. Please correct as indicated:

$$\{Speedup'_{imperfect}(x)\big|_{x=x_{opt}} = 0\} \wedge \{Speedup''_{imperfect}(x)\big|_{x=x_{opt}} < 0\}$$
$$\{\beta f(x_{opt}) - \overline{F}(x_{opt}) = 0\} \wedge \{\beta f'(x_{opt}) + f(x)_{opt} < 0\}$$
$$\left\{\frac{f(x_{opt})}{\overline{F}(x_{opt})} = \frac{1}{\beta}\right\} \wedge \left\{f'(x_{opt}) < \frac{-f(x)_{opt}}{\beta}\right\}$$

In column 12, line 8, replace "$\overline{F}'$" with --$F'$--.

Signed and Sealed this

Third Day of October, 2006

JON W. DUDAS
*Director of the United States Patent and Trademark Office*